US006845005B2

(12) United States Patent
Shimano et al.

(10) Patent No.: US 6,845,005 B2
(45) Date of Patent: Jan. 18, 2005

(54) PORTABLE COMPUTER USABLE IN A LAPTOP AND TABLET CONFIGURATIONS

(75) Inventors: Kenji Shimano, Tokyo (JP); Darren Saravis, Signal Hill, CA (US); John Duval, Long Beach, CA (US); Mike Wick, Long Beach, CA (US); Cary Chow, Los Angeles, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 348 days.

(21) Appl. No.: 10/023,236

(22) Filed: Dec. 17, 2001

(65) Prior Publication Data

US 2003/0112590 A1 Jun. 19, 2003

(51) Int. Cl.[7] .................................................. G06F 1/16
(52) U.S. Cl. ........................ 361/683; 345/169; 345/173
(58) Field of Search .............................. 361/679–686; 312/223.1, 223.2; 248/917–924, 460; 206/759, 760; 345/173–176, 156, 157, 168, 169

(56) References Cited

U.S. PATENT DOCUMENTS

| | | | |
|---|---|---|---|
| 5,200,913 A | | 4/1993 | Hawkins et al. |
| 5,268,817 A | * | 12/1993 | Miyagawa et al. ......... 361/681 |
| 5,333,116 A | | 7/1994 | Hawkins et al. |
| 5,335,142 A | | 8/1994 | Anderson |
| 5,498,165 A | | 3/1996 | Tseng |
| 5,768,163 A | | 6/1998 | Smith, II |
| 5,917,475 A | | 6/1999 | Kuzunuki et al. |
| 5,987,704 A | | 11/1999 | Tang |
| 6,141,208 A | | 10/2000 | Hong et al. |
| 6,202,256 B1 | | 3/2001 | Bovio et al. |
| 6,219,681 B1 | | 4/2001 | Hawkins et al. |
| 6,256,194 B1 | | 7/2001 | Choi et al. |
| 6,262,885 B1 | * | 7/2001 | Emma et al. ............... 361/683 |
| 6,275,376 B1 | | 8/2001 | Moon |
| 6,297,947 B1 | | 10/2001 | Howell et al. |
| 6,300,921 B1 | | 10/2001 | Moriconi et al. |
| 6,301,768 B1 | | 10/2001 | Toeniskoetter |
| 6,304,433 B2 | | 10/2001 | O'Neal et al. |
| 6,366,935 B2 | * | 4/2002 | Hawkins et al. ............ 361/681 |
| 6,394,431 B1 | | 5/2002 | Smith |
| 2001/0001859 A1 | | 5/2001 | Hawkins et al. |
| 2003/0112588 A1 | * | 6/2003 | Shimano ..................... 361/683 |
| 2003/0112589 A1 | * | 6/2003 | Shimano et al. ............ 361/683 |

* cited by examiner

*Primary Examiner*—Lisa Lea-Edmonds
(74) *Attorney, Agent, or Firm*—Pillsbury Winthrop LLP

(57) ABSTRACT

Embodiments of the present invention are directed to a portable computer, such as a laptop or notebook computer, a subnotebook computer, a personal digital assistant, a wireless phone or the like, that can be set up in a closed configuration, a laptop configuration or a tablet configuration. The portable computer may include a base unit having a primary input device, such as a keyboard or pointing device, and a display unit having a display device. The base unit and the display unit may be coupled so that the display unit can be moved relative to the base unit to place the portable computer in a desired configuration.

15 Claims, 33 Drawing Sheets

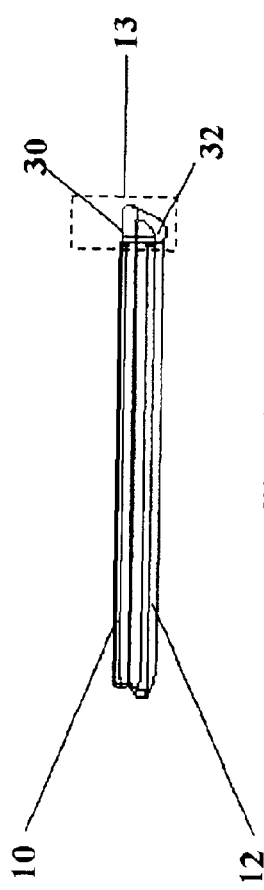

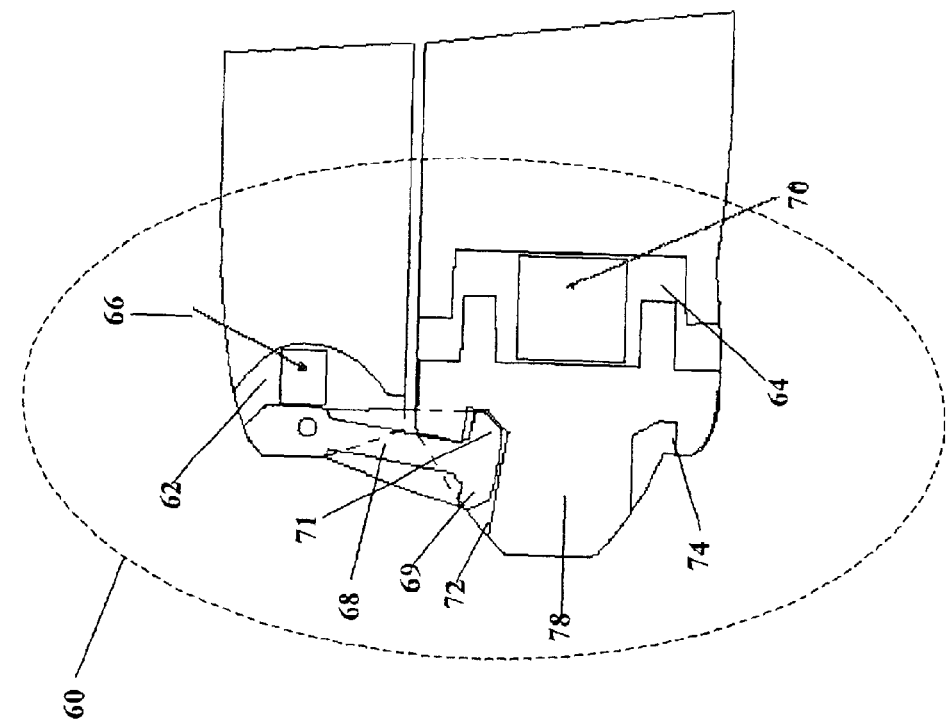

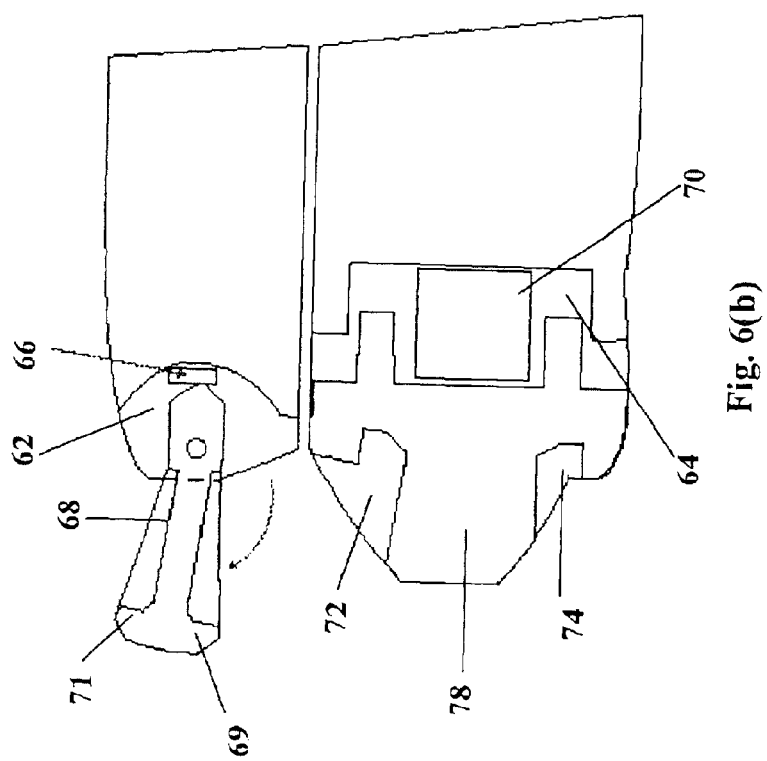

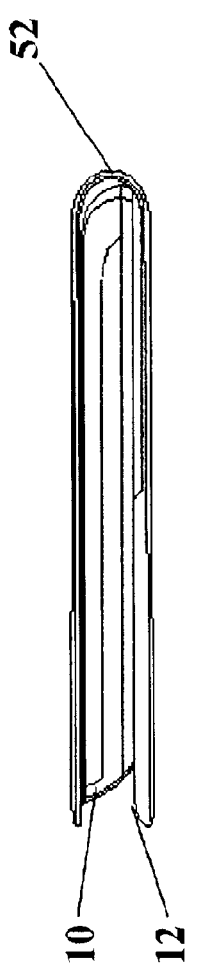

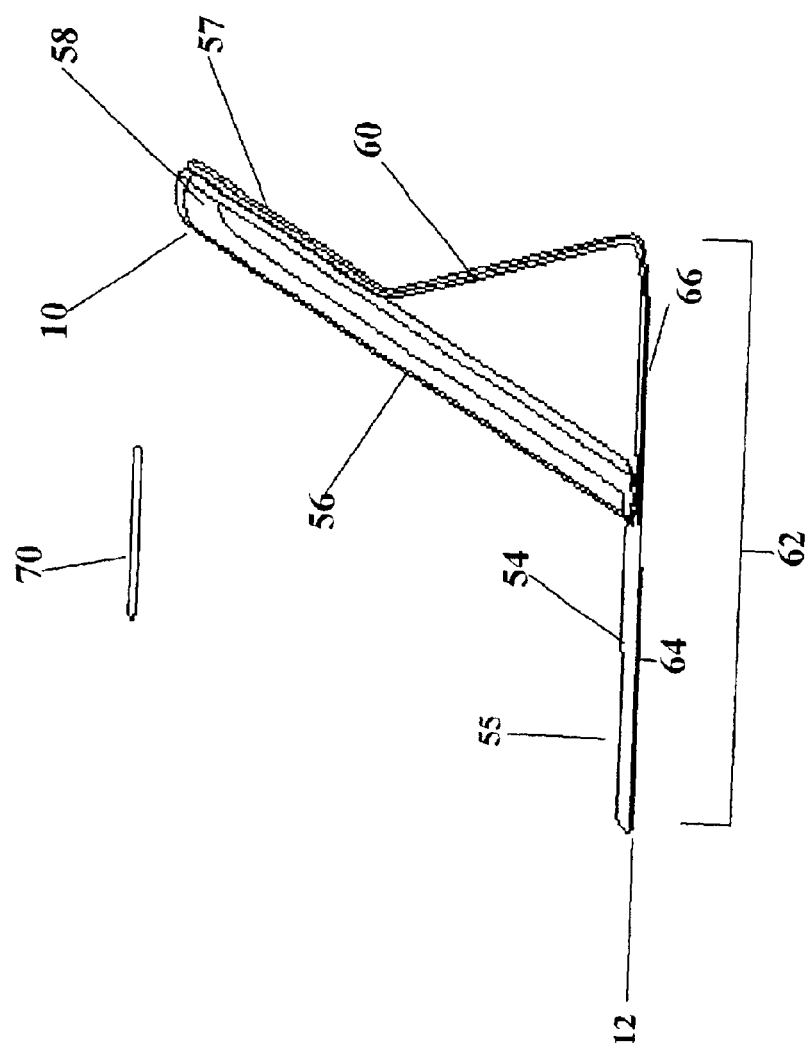

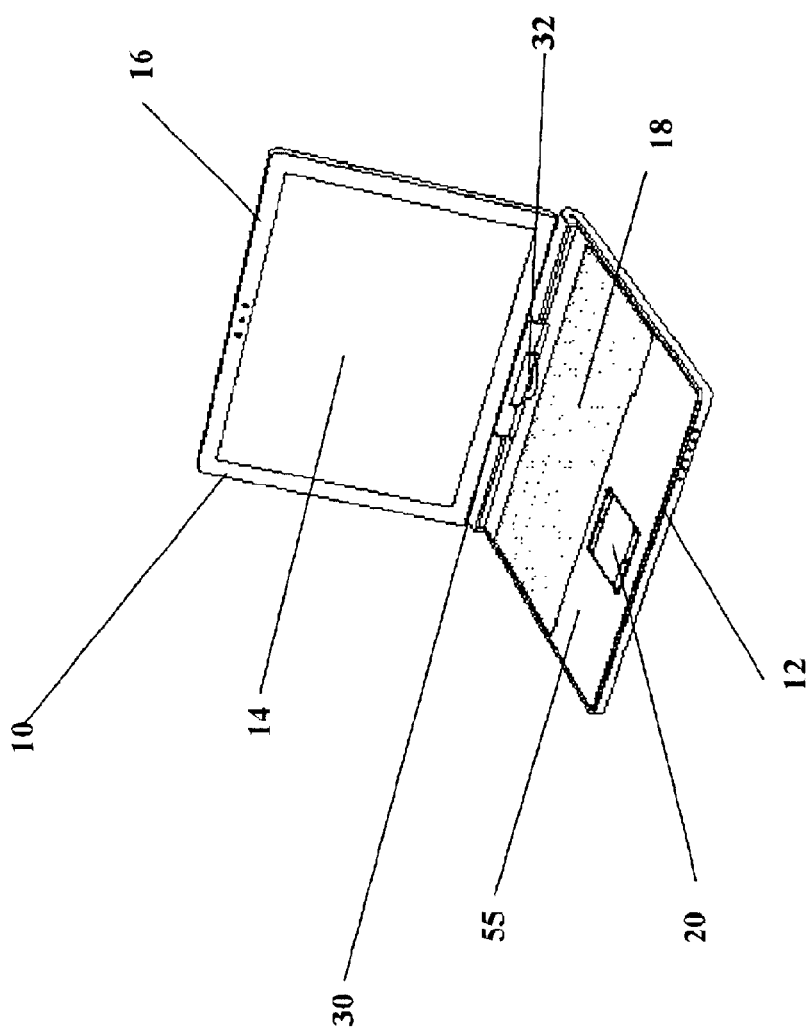

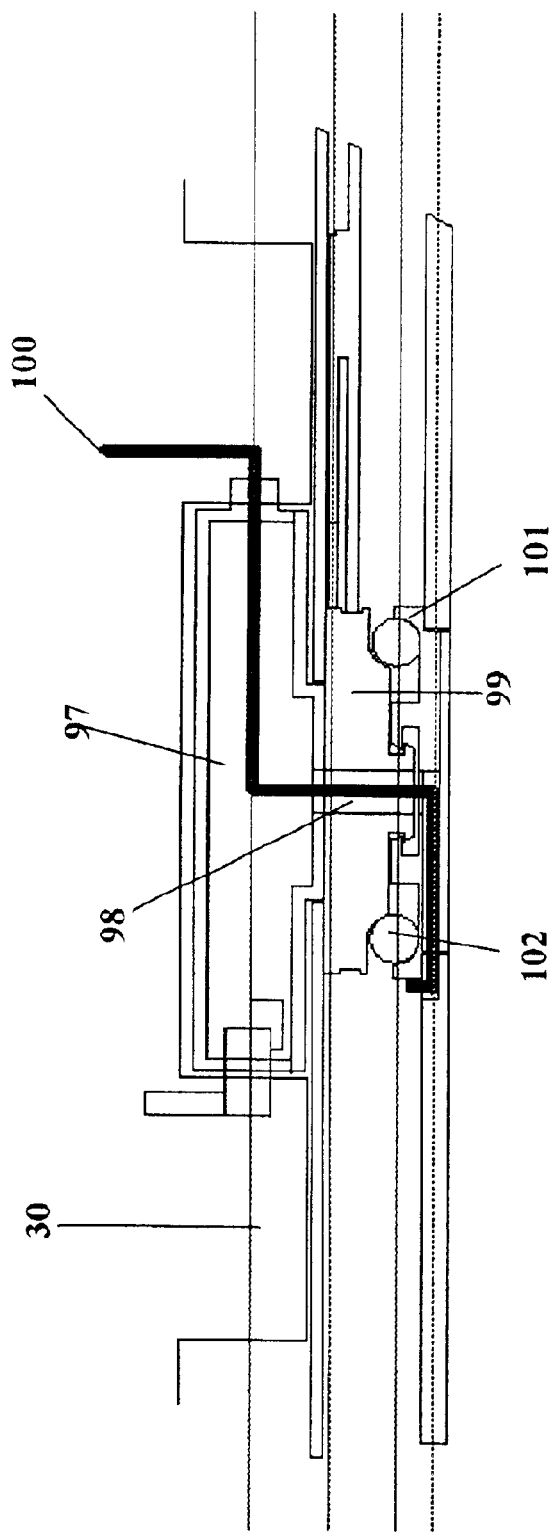

PORTABLE COMPUTER USABLE IN A LAPTOP AND TABLET CONFIGURATIONS

BACKGROUND OF THE INVENTION

Portable computers, including laptop computers or notebook computers, have increased in popularity since their introduction to the electronics market. Recent increases in processor speed and decreases in memory cost, memory size and processor power consumption have allowed portable computers to operate at increased performance levels. Because of this increased performance, users are now able to use portable computers in many complex applications where performance is critical instead of relying only on high performance desktop computers.

The increased popularity of portable computers can also be attributed to quality improvements and reductions in size and weight of other components, such as displays. The image quality of the displays on portable computers has improved to a level similar or equal to that of desktop computers. Liquid crystal displays (LCDs) are utilized in many portable computers because LCDs are lightweight, have low power consumption, and retain a good quality of display even when exposed to different lighting conditions.

In the past, portable computers were only able to accept input via a keyboard, a mouse, or a built-in pointing device. Recent advances in technology and input devices now allow for users to input data on a touch screen via a person's digits or an electronic stylus using pre-defined input screens. In addition, the electronic stylus may be used in conjunction with optical character recognition (OCR) software. The use of a touch screen to input data is sometimes referred to as operating in "tablet mode," because the computer is being utilized in a similar manner to a tablet of paper. Because the keyboard is not essential for data input in a computer being used in tablet mode, the size of the keyboard has been reduced in some portable computers and even eliminated in the standard configuration of smaller portable computers, such as the handheld computers commonly referred to as personal digital assistants (PDA). In some of these PDAs, a virtual keyboard may be used by an operator with a stylus.

While many users prefer a tablet-type portable computer with a stylus as an input device, many other users prefer to have a portable computer with a full keyboard configuration depending upon the application for which the computer is being utilized. Therefore, users desire a portable computer that can be configured to operate either as a normal laptop computer with keyboard or pointing device input ("laptop configuration"), or as a tablet computer with an electronic stylus or other touchscreen-type input device and/or OCR software. It is also generally desirable that the display of the portable computer be protected when the portable computer is being transported.

U.S. Pat. No. 5,987,704 to Tang, discloses a portable computer having a display unit with a display screen and base unit with a keyboard, where hinging gear assemblies allow the display unit to be rotated 360 degrees relative to the base unit. Each gear assembly involves two toothed gears, and deformable braking mechanisms for each of the gears. The braking mechanisms must be activated to hold the gears in a rotational position relative to each other. The use of toothed gears provides for low performance, because slippage will occur if a tooth of a gear fails, affecting the stability of the rotating display unit. Further, according to the Tang reference, the gear must protrude from the sides of the display and base units, increasing the likelihood of damage to these parts.

U.S. Pat. No. 6,275,376 to Moon discloses a portable computer in which the display unit (including the display screen) is supported on a support block that is affixed to a shaft capable of rotating about a vertical axis. The support block also forms a portion of a multi-part shaft that rotates about a horizontal axis to allow the portable computer to be pivoted between an open and closed position. The electrical cable connecting the base unit and the display unit is passed around and along the vertical shaft. Because the portable computer described in the Moon reference does not include any means for limiting rotation of the display about the vertical axis, the user may damage the cable by rotating the display about this axis. Moreover, the Moon reference does not disclose any means for holding the portable computer in any particular configuration.

U.S. Pat. Nos. 5,200,913, 5,333,116, and 6,219,681 to Hawkins and U.S. Patent Publication No. 2001/0001859 also to Hawkins disclose a portable computer in which the display unit, including the LCD display, may be moved and folded to allow the display unit to be utilized in tablet mode. The display unit is placed on top of the keyboard. The display unit or display is pivotally mounted to a base housing by means of a pair of forward hinge and arm assemblies and a rear hinge plate. Each forward hinge and arm assembly is pivotally attached to one end of the forward portion of the display side wall to form a first pivot. The other end of the hinge is pivotally attached to the housing adjacent to the side margin region conveniently located between the front and rear edge of the keyboard. When the computer is open and in laptop mode, the rear hinge plate assists in providing lateral stability to the display. The rear hinge plate also provides two axes of rotation parallel to the width of the display and housing when the laptop is rotated to the tablet mode. The Hawkins reference requires a complex and awkward combination of mechanical parts to place the computer in tablet mode. In addition, the Hawkins reference does not provide for the portable computer to be placed in a closed mode.

Accordingly, a need exists for a portable computer that may be placed in a closed configuration for secure transportation, and may also be utilized in both a laptop mode (where a user inputs data via a keyboard or pointing device) and a tablet mode (where no keyboard is used to input data).

BRIEF DESCRIPTION OF THE DRAWINGS

FIG. 4(a) presents a side view of the portable computer in the closed configuration according to a first embodiment of the present invention;

FIG. 7 presents a side view of the portable computer in a closed configuration according to a second embodiment of the present invention;

FIG. 8(b) presents a side view of the portable computer in a laptop configuration according to a second embodiment of the present invention;

FIGS. 11(a) and 11(b) illustrate a portable computer in the laptop configuration according to a third embodiment of the invention

FIG. 13(e) illustrates a cross-sectional side view of a hinging assemble according to a third embodiment of the invention.

DETAILED DESCRIPTION OF THE INVENTION

The present invention is directed to a portable computer that may be placed in a closed configuration, a laptop configuration, and a tablet configuration. While the term "portable computer" is used, it should be understood that this term is not limited to traditional laptop and notebook computers and that the term "portable computer" is meant to encompass other electronic devices having input processing capabilities, such as, subnotebook computers, PDAs, wireless telephones, and the like. The portable computer may include a display device and a keyboard, a mouse, a pointing device, or some other primary input device(s) separate from the display device. The display device may be used as a secondary input device, possibly in conjunction with an electronic stylus or similar device. In the laptop configuration, the user may input data using the primary input device and may receive information from the laptop via the display device. In the tablet configuration, the user may receive information from the display device and may use the display device as a secondary input device. In this configuration, the user may be prevented from accessing the keyboard or other primary input device(s), e.g., by placing the display device over the keyboard or other primary input device(s). The technology for using a display device as a touchscreen is well known in the art. In particular, U.S. Pat. No. 5,917,475 to Kuzunuki et al. describes a display device that may be used as a touchscreen to transmit handwriting input to circuitry capable of interpreting the handwriting as recognized characters. In embodiments of the present invention, such circuitry may include a combination of processors, integrated circuits, gate arrays, memories, software and the like. In the closed configuration, the display device and the keyboard or other primary input device(s) may be enclosed so as to prevent the user from accessing either and to prevent damage to the portable computer during transportation or storage.

Figure 1:
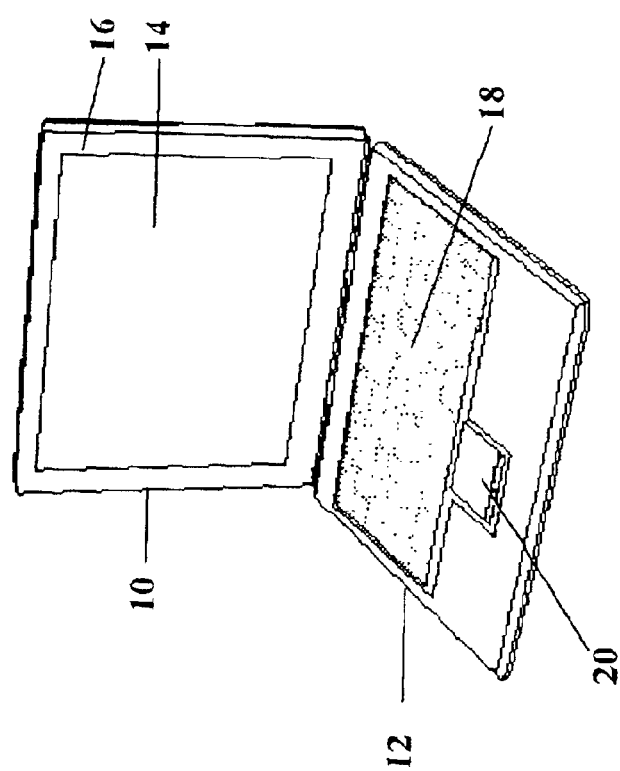
FIG. 1 illustrates the portable computer utilized in the laptop configuration according to an embodiment of the present invention.

As illustrated in FIG. 1, embodiments of the portable computer may have a display unit 10 and a base unit 12. The display unit 10 may be connected to the base unit 12 utilizing a hinging assembly 13. Alternatively, as illustrated in connection with FIGS. 7 to 9, a cover unit 52 may connect the display unit 10 to a base unit 12 having a keyboard 18 or other primary input device. In embodiments of the invention, the display unit 10 may include a display screen 14 and a display screen frame 16. The base unit may include a keyboard 18, a pointing device 20 and/or some other primary input device. In embodiments of the invention, the display unit 10, the base unit 12 or both may also include a central processing unit (not shown) and or a memory (not shown). The portable computer may also include an electrical connection between elements of the base unit 12 and elements of the display unit 10 so that signals representative of user input, data, control commands, status information and the like may be passed therebetween.

Embodiments of Type Shown in FIGS. 1–6

In embodiments of the present invention, the display unit 10 of the portable computer may be connected to the base unit 12 utilizing a hinging assembly 13. As shown in FIGS. 1–6, the display unit 10 includes a display screen 14 and a display screen frame 16 that includes a back surface 17. The base unit may include a keyboard 18, a pointing device 20, a central processing unit (CPU) (not shown), and a memory (not shown). A hinging assembly 13, including an A hinge 32, a B hinge 30 and an armature 33, may couple the base unit 12 to the display unit 10 so that they may rotate relative to each other. In the illustrated embodiment, a portion of the B hinge 30 is fixedly coupled to the display unit 10 and another portion of the B hinge 30 is fixedly coupled to the armature 33. Similarly, a portion of the A hinge 32 is fixedly coupled to the base unit 12 and another portion of the A hinge is fixedly coupled to the armature 33. For both hinges, the portion connected to the armature 33 rotates in relation to the portion coupled to either the base unit 12 or the display unit 10.

The portable computer may be placed in a "closed configuration," which protects the display screen 14 and the keyboard 18, pointing device 20 or other primary input device(s) form damage. The portable computer may be placed in the closed configuration when it is being stored or transported or is otherwise not being operated. The portable computer may be operated in either of two configurations, the "laptop configuration" or the "tablet configuration." These three configurations are further described below.

Figure 2A:
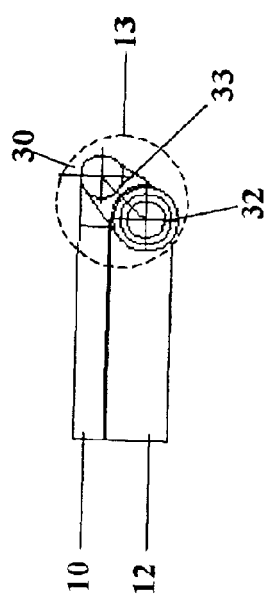
FIG. 2(a) illustrates the use of A and B hinges in the portable computer in the closed configuration according to a first embodiment of the present invention.
Figure 2B:
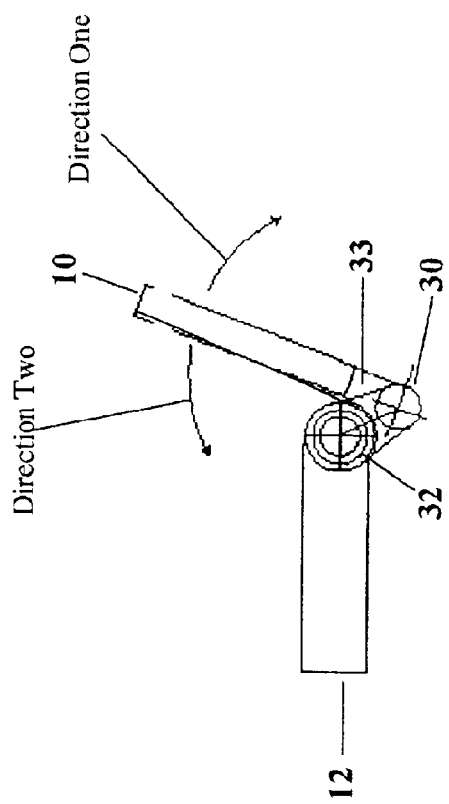
FIG. 2(b) illustrates the use of A and B hinges in the portable computer in the laptop configuration according to a first embodiment of the present invention.
Figure 2C:
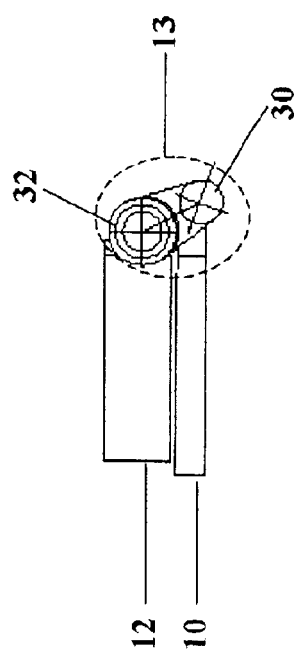
FIG. 2(c) illustrates the location of the A and B hinges when the portable computer is in the tablet configuration according to a first embodiment of the present invention.
Figure 4B:
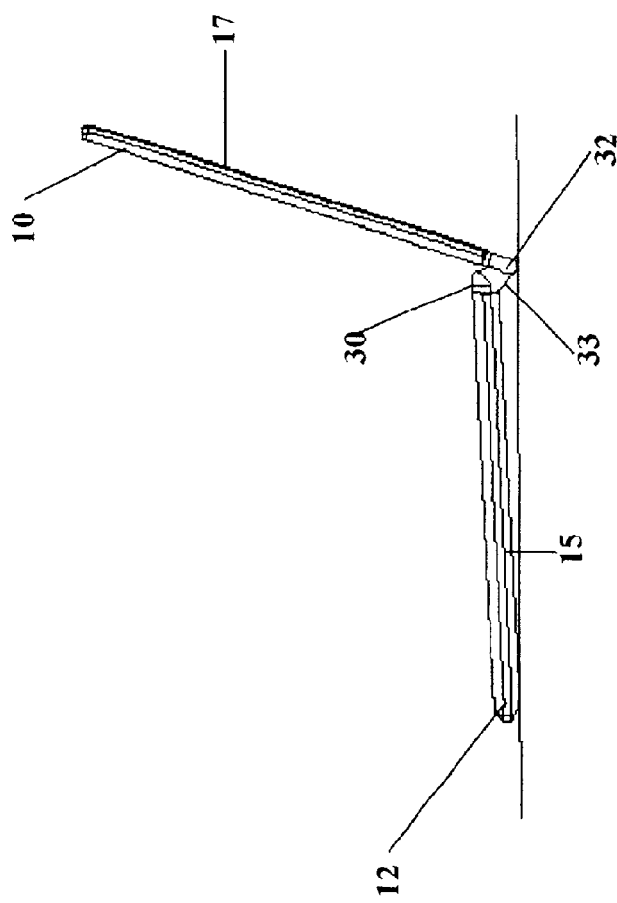
FIG. 4(b) presents a side view of the portable computer in the laptop configuration according to a first embodiment of the present invention.
Figure 4C:
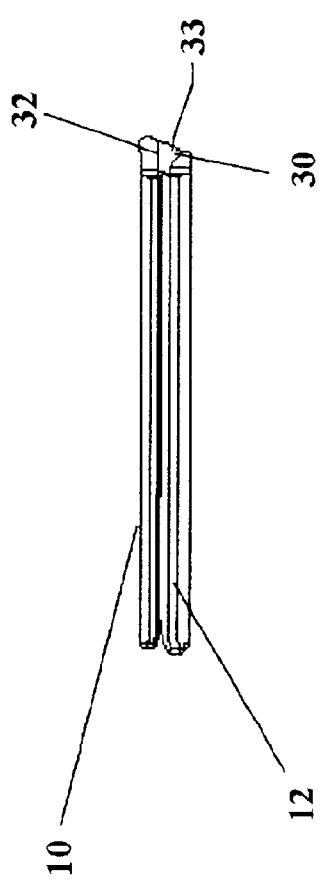
FIG. 4(c) presents a side view of the portable computer in the tablet configuration according to a first embodiment of the present invention.

FIGS. 2(a)–2(c) and 4(a)–4(c) illustrate how the A hinge 32 may be rotated to allow the display unit 10 to be tilted relative to the base unit 12 to place the portable computer in one of the three configurations. FIG. 2(a) illustrates the use of A and B hinges in the portable computer in the closed configuration according to an embodiment of the present invention. FIG. 4(a) presents a side view of the portable computer in the closed configuration according to an embodiment of the present invention. The portable computer may be placed in a closed configuration where the display unit 10 rests directly in contact with the base unit 12 so that the display 14, the keyboard 18, and the pointing device 20 are in between the display unit 10 and the base unit 12. In the closed configuration, the display unit 10 is rotated 0 degrees relative to the base unit 12.

In order to move the portable computer from the tablet configuration past the laptop configuration to the closed configuration, the A hinge 32 and the B hinge 30 may be rotated, either individually or simultaneously. In embodiments of the invention, one of the hinges may be rotated to transition the portable computer from the closed configuration to the laptop configuration, and the other hinge may be rotated to transition the portable computer from the laptop configuration to the tablet configuration. For example, in the embodiment shown in FIGS. 1–6, when the portable computer is in the closed configuration, a user may apply a separating force to rotate said display unit 10 relative to said base unit 12. The initial application of this separating force may cause only the A hinge 32 to rotate until the portable computer reaches the laptop configuration. One embodiment in which the hinges rotate individually is described in greater detail with respect to FIG. 3.

In embodiments of the invention, the rotational range of the A hinge 32 may be limited to an upper limit that is reached when the portable computer is in the laptop configuration. For example, in the embodiment shown, the rotational range of the A hinge 32 may be limited such that no further rotation of the A hinge 32 occurs after the display unit 10 forms about a 110° angle with said base unit 12. In embodiments of the invention, the range of rotation of the A hinge 32 may be limited by a physical stop, which may be located on an external or internal surface of the A hinge 32 and/or on a surface of the display unit 10 or base unit 12.

FIG. 1 illustrates the portable computer in the laptop configuration. In the laptop configuration, the bottom surface 15 of the base unit 12 may rest on a planar surface (such as a desktop, a user's lap or palm, or a similar substantially flat surface) and the display unit 10 may be rotated approximately 90° relative to the base unit 12. In the embodiment shown, this "laptop tilt angle" formed between the display unit 10 and the base unit 12 is actually closer to 110°, and it should be understood that the laptop tilt angle may be selected so as to optimize user comfort and display screen 14 visibility while the portable computer is being used in the laptop mode. In this embodiment of the invention, the portable computer may be placed in the laptop configuration by rotating hinge A 32 in direction 1 about a horizontal axis so as to tilt the display unit 10 relative to the base unit 12 until the laptop tilt angle is reached (as shown in FIGS. 2(a), 2(b) 4(a) and 4(b)). In the laptop configuration, the user may utilize the pointing device 20 or keyboard 18 to send user input signals to the CPU (not shown), which may be in the base unit 12. The results of the user's interaction and other output from the CPU may be shown to the user on the display screen 14.

It should be understood that when the user is utilizing the portable computer in the laptop configuration, the user may make minor adjustments (e.g., up to about 15 degrees in either direction) to the tilt angle of the display unit 10 for optimal viewing ease, etc. Such adjustments should not be considered different configurations of the portable computer and shall be considered part of the "laptop configuration" throughout this description of embodiments of the invention.

Figure 3:
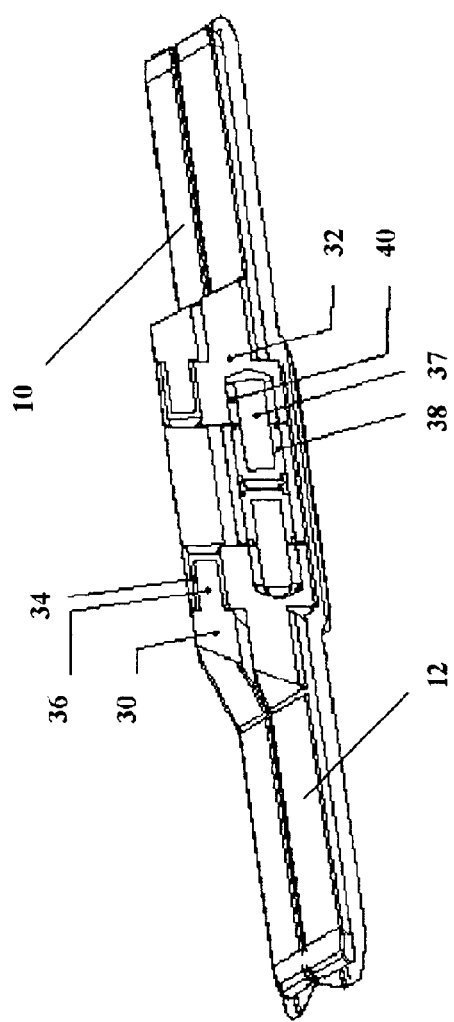
FIG. 3 illustrates a cross-section of both the A and B hinge assemblies according to a first embodiment of the present invention.

FIG. 3 illustrates a cross section of the A hinge 32 and B hinge 30 according to an embodiment of the present invention. In embodiments of the invention, the A hinge 32 may have a low friction device 38 surrounding the A hinge shaft 37. However, the A hinge 32 may allow a different friction in each direction. In embodiments of the invention, a directional clutch 40 may be used to allow the A hinge 32 to rotate with different levels of friction when rotated in opposite directions. For example, the directional clutch 40 may allow the A hinge 32 to rotate with a low level of friction in an opening (clockwise) direction (shown as direction one in FIG. 2(b)) and may engage a higher level of friction in the closing (counterclockwise) direction (shown as direction two in FIG. 2(b)). In alternative embodiments of the invention, the B hinge 30 may have a lower level of friction resisting its rotation than the A hinge 32, causing the B hinge 30 to move before the A hinge 30.

As a result, when the A hinge 32 is being rotated to move the display unit 10 in the opening direction, the friction resisting rotation of the A hinge 32 may be less than the friction resisting rotation of the B hinge 30. Accordingly, when a separating force is initially applied to the display unit 10 and the base unit 12, the A hinge 32 rotates first and the B hinge 30 does not rotate. Thus, when the display unit 10 is first moved to change the portable computer from the closed configuration to the laptop configuration, the A hinge 32 rotates first and allows movement of the display unit 10 to approximately 110 degrees relative to the base unit 12.

The A hinge 32 may have sufficient friction resisting rotation in either the opening or the closing direction to keep the display unit 10 of the portable computer tilted. The minimum friction necessary to maintain the display unit in the tilted position may be calculated based on the weight of the display unit 10 and the laptop tilt angle of the display unit in the laptop configuration. In embodiments in which the base unit 12 rests partially on the A hinge 32 as shown in FIGS. 1–5 and as described in greater detail below, the minimum friction force required may also depend upon the weight of the base unit 12 and the angle between the base unit 12 and the surface upon which it rests.

Conversely, when the display unit 10 is moved in the closing direction to change the portable computer from the tablet configuration to either the laptop configuration or the closed configuration, the friction resisting rotation of the A hinge 32 may be stronger than the friction resisting rotation of the B hinge 30 due to engagement of the directional clutch 40. Thus, in the closing direction, the friction resisting rotation of the A hinge 32 may be greater than the friction resisting rotation of the B hinge 30, so that the B hinge 30 rotates first when a closing force is applied. Accordingly, a closing force applied to the display unit 10 and the base unit 12 causes the B hinge 30 to rotate first and allows the portable computer to move to the laptop configuration from the tablet configuration. When the portable computer reaches the laptop configuration, the B hinge's rotation may be complete (i.e., the B hinge 30 may reach a lower limit of its range of rotation) and the A hinge 32 may begin to rotate in direction 2 to place the display unit 10 on top of the base unit 12 to reach the closed configuration. The latching assembly 60, described below with respect to FIGS. 6(*a*)–6(*e*), may be used to hold both the display unit 10 and the base unit 12 together in the closed configuration.

In addition, when the portable computer is operating in the laptop configuration, the base unit 12 may tilt at a slight angle with respect to it's supporting surface and may partially rest on the A hinge 32 to allow for comfortable usage of the keyboard 18. FIGS. 2(*b*) and 4(*b*) illustrate the tilting of the base unit 12 according to an embodiment of the present invention. As the A hinge 32 is rotated to place the display unit 10 at the laptop tilt angle (approximately 110 degrees in the embodiment shown) relative to the base unit 12, the B hinge 30 may move from a position above (and to the right of) the A hinge 32 to a position below (and to the right) of the A hinge 32. As a result, the rear portion of the base unit 12 may be elevated off of the support surface, while the front portion of the base unit 12 continues to rest on the support surface. In alternative embodiments of the invention, the B hinge 30 may begin at a position above and to the left of the A hinge 32 in the closed configuration and may move to a position below and to the left of the A hinge 32 in the laptop configuration. Furthermore, as mentioned above, in embodiments of the invention, the B hinge 30 may be rotated to change the portable computer from the closed configuration to the laptop configuration and the A hinge 32 may not rotate during this transition. In other embodiments of the invention, the rotation of the A hinge 32 and the B hinge 30 may not be isolated during the transition from the closed configuration to the laptop configuration to the tablet configuration.

As discussed above, in the illustrated embodiment of the invention, the B hinge 30 may not rotate initially when the portable computer is being opened to put the portable computer in the laptop configuration from the closed configuration. When moving the display unit 10 in the opening direction to place the portable computer into either the laptop configuration or the tablet configuration, the A hinge 32 may rotate first because the friction force resisting rotation of the A hinge 32 is less than that resisting rotation of the B hinge 30. FIG. 2(*b*) illustrates how the B hinge 30 has not rotated significantly even though the display unit 10 has been tilted to the laptop tilt angle relative to the base unit 12. The B hinge 30 may begin to rotate when the A hinge 32 reaches an upper limit in its range of rotation. As discussed above, this upper limit may result from the location of a physical stop on an external or internal surface of the A hinge 32. The lower limit of the range of rotation will generally correspond to the portable computer reaching the closed configuration, in which case, the base unit 12 may act as a physical stop to create the lower limit.

Figure 5:
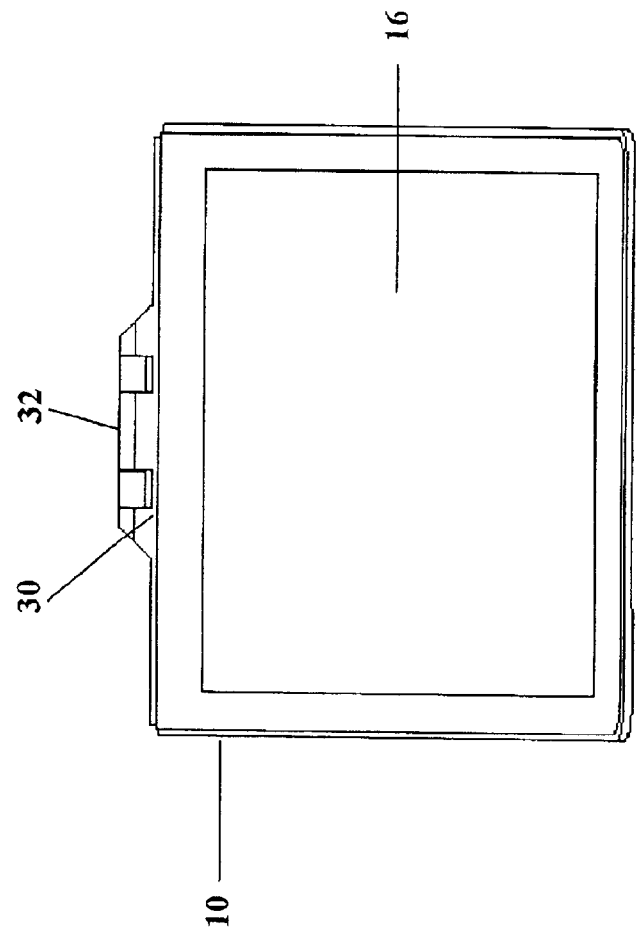
FIG. 5 presents a top perspective view of the portable computer in the tablet configuration according to a first embodiment of the present invention.
Figure 6C:
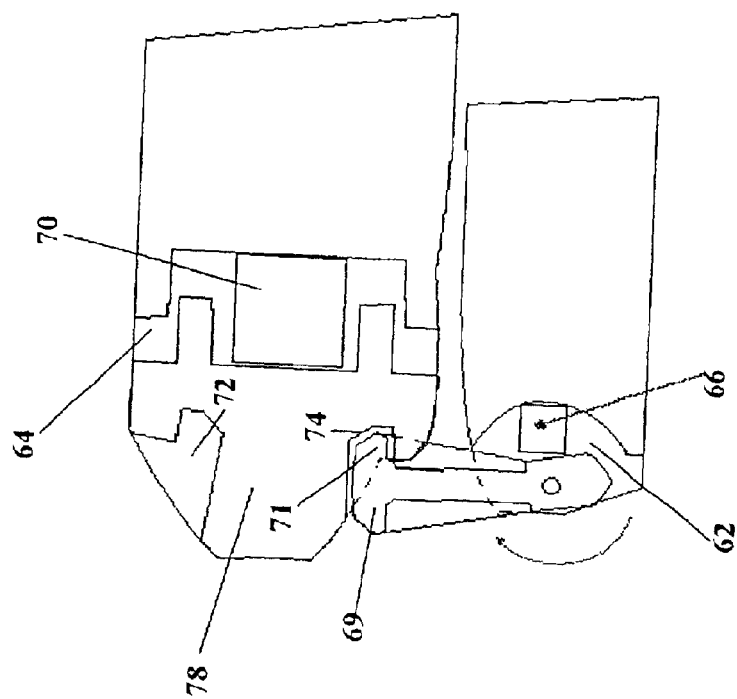
FIG. 6 illustrates a latching assembly according to an embodiment of the present invention.
Figure 6D:
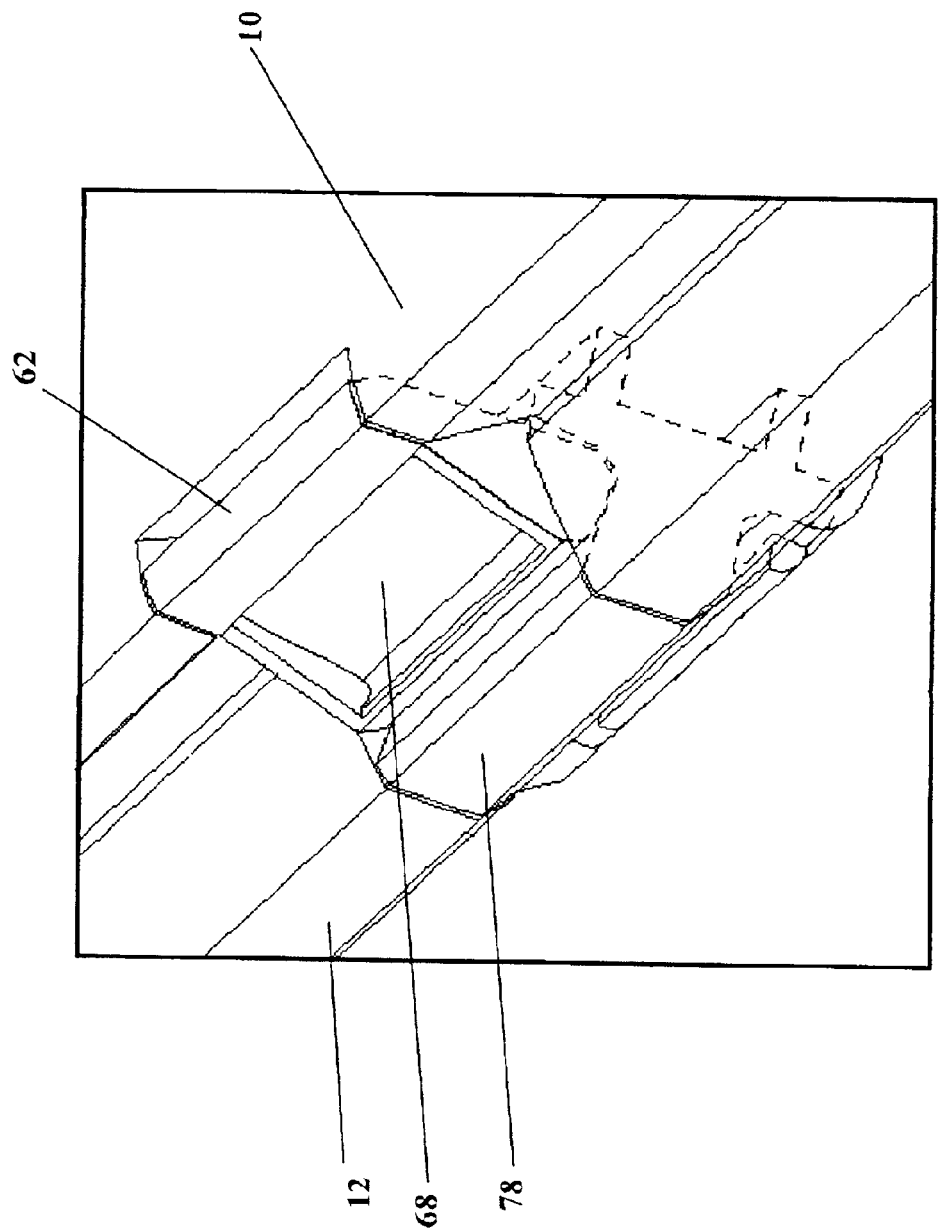
Figure 6E:
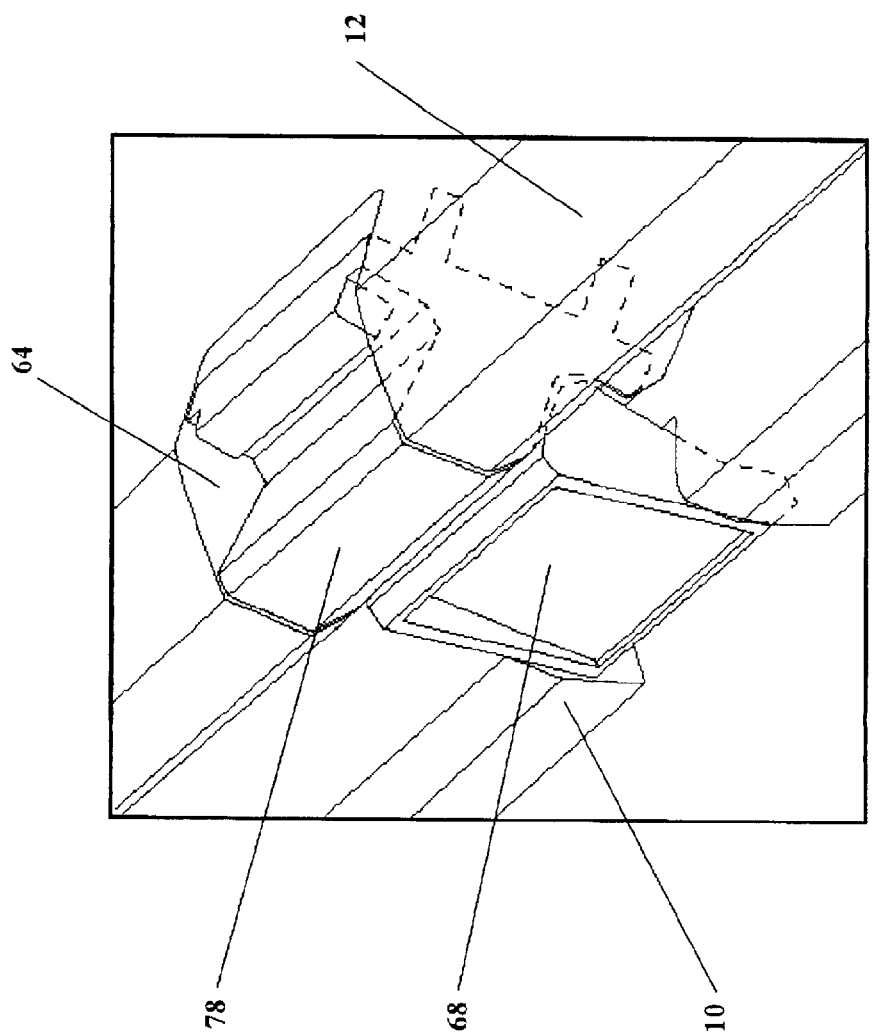

FIGS. 2(*c*) and 4(*c*) illustrate the location of the A hinge 32 and B hinge 30 when the portable computer is in the tablet configuration In the tablet configuration, the display unit 10 is tilted 360 degrees relative to the bottom disclosure 12 from its original starting position in the closed configuration. In the tablet configuration, the bottom surface 15 of the base unit 12 rests next to the rear surface 17 of the display unit 10, while the keyboard 18 and the pointing device 20 rest on the planar surface on which the portable computer rests. FIG. 5 presents a top perspective view of the portable computer in the tablet configuration according to an embodiment of the present invention.

In moving from the laptop configuration to the tablet configuration, the B hinge 30 is rotated to its full extent to allow the display unit 10 to tilt 360 degrees relative to the base unit 12 as illustrated in FIG. 2(*c*). Accordingly, the range of rotation of the B hinge 30 may have an upper limit imposed by the location of the bottom surface of the base unit 12. In the embodiment shown, the B hinge 30 may have a rotation range of about 250 degrees. As shown in FIG. 3, a friction force may be applied to the B hinge shaft 36 by a high friction device 34. In embodiments of the invention, the B hinge 30 may experience the same amount of friction when rotating in either direction. The high friction device 34, low friction device 38 and directional clutch 40 may be selected such that the amount of friction resisting rotation of the B hinge 30 may be selected so as to be greater than the amount of friction resisting rotation of the A hinge 32 in the opening direction and less than the amount of friction resisting rotation of the A hinge 32 in the closing direction. When moving the portable computer from the laptop configuration to the tablet configuration (i.e., moving the display unit 10 in the opening direction), the B hinge 30 may start to rotate once the A hinge 32 has completed its full range of rotation. Conversely, when moving the portable computer from the tablet configuration to the laptop configuration, the B hinge 30 may rotate initially and the A hinge 32 may begin to rotate only when the B hinge 30 has reached the lower limit of its range of rotation. As with the upper limit applied to the range of rotation of the A hinge 32, this lower limit may be applied by a physical stop on an external or an internal surface of the B hinge 30 and/or a surface of the display unit 10 or the base unit 12.

The keyboard 18, pointing device 20 or other primary input device(s) may not be utilizable in the tablet mode and the user may input data using the display screen 14 as a touchscreen. The user may use an electronic stylus or a similar device in conjunction with the touchscreen. In embodiments of the invention, a software lockout may prevent the keyboard 18 and pointing device 20 from being utilized when the portable computer is in the tablet mode. In alternative embodiments of the invention, the keyboard 18, pointing device 20 and other primary input device(s) may be in a recessed region of the base unit 12 so that these input devices do not rest on the support surface. The latter embodiment may be additionally beneficial insofar as it protects the primary input devices from damage during use of the portable computer in the tablet configuration.

FIGS. 6(*a*)–6(*c*) illustrate a latching assembly 60 according to an embodiment of the present invention. In embodiments of the invention (including those described in the subsections above), the portable computer may be secured in the closed configuration, the tablet configuration or both by the latching assembly 60. The latching assembly 60 may include a latching arm 68 having a projection that fits within a cavity (72, 74) in a latching block 78 when the latching assembly is in a closed state. In the embodiment shown, the latching arm 68 may be mounted on an upper latch body 62 connected to the display unit 10, and the latching block 78 may be mounted on a lower latch body 64 connected to the base unit 12. However, in alternative embodiments the locations of the upper latch body 62 and lower latch body 64 may be switched.

In embodiments of the invention (such as the one shown in FIGS. 6(*a*)–6(*e*)), the latching arm 68 may have more than one projection 69 and 71 and/or the latching block 78 may have more than one cavity 72 and 74. The multiple projections 69 and 71 and/or cavities 72 and 74 may be used to maintain the portable computer in different configurations. For example, in the illustrated embodiment, which may be used with embodiments of the invention of the type shown in FIGS. 1–5, the latching arm 68 may have projections 69 and 71 on opposite sides. In particular embodiments, the latching arm may have substantially identical projections 69 and 71 so that the latching arm 68 is substantially symmetric. The first projection 69 of the latching arm 68 may be inserted into the first cavity 72 of the latching block 78 to maintain the portable computer in the closed configuration. When the portable computer is to be maintained in the tablet configuration, the latching arm 68 may be pivoted approximately 180° and the second projection 71 of the latching arm 68 may be inserted into the second cavity 74 of the latching block 78. In alternative embodiments, either projection 69 and 71 of the latching arm 68 may fit into a single cavity of the latching block 78 or a single projection of the latching arm 68 may fit into one of two cavities 72 and 74 of the latching block.

In embodiments of the invention, the latching block may be disposed on the front surface of the base unit 12 and the latching arm 68 may be disposed on the front surface of the display unit 10, or vice versa. The latching arm 68 may be coupled to the base unit 12 or display unit 10 using a arm spring 66 that is pre-biased to exert a force on the latching arm 68 to press a projection 69, 71 of the latching arm 68 into a cavity 72, 74 of the latching block 78.

The latching block may be supported on a release spring 70 that may exert a counter-force when the user pushes the latching block toward the base unit 12 or display unit 10. When a projection 69 (or 71) of the latching arm 68 is inserted into a cavity 72 (or 74) of the latching block 78, pushing the latching block 78 to compress the release spring 66 may cause a portion of the latching arm 68 to interfere with a physical stop (e.g., a portion of the front surface of the display unit 10, base unit 12, upper latch body 62 or lower latch body 64). As a result, the projection 69 (or 71) of the latching arm 68 may be forced out of the cavity 72 (or 74), releasing the latching assembly so that the display unit 10 is free to rotate relative to the base unit 12. In embodiments of the invention, the arm spring 66 and the release spring 70 may be compression springs, tension springs, torsion springs or the like. Moreover, although the arm spring 66 and the release spring 70 are described as "springs," it should be understood that any elastic element may be used.

Figure 8A:
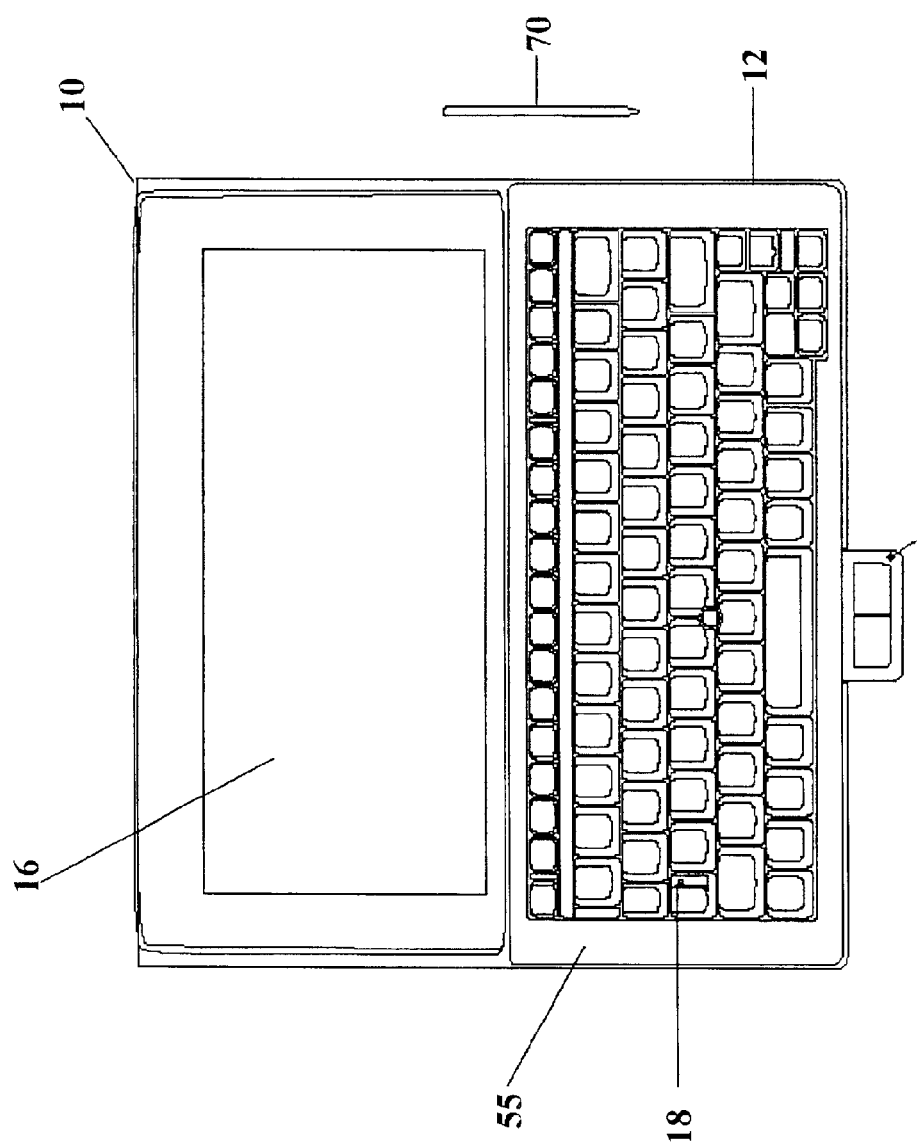
FIG. 8(a) presents a top view of the portable computer in a laptop configuration according to a second embodiment of the present invention.
Figure 9A:
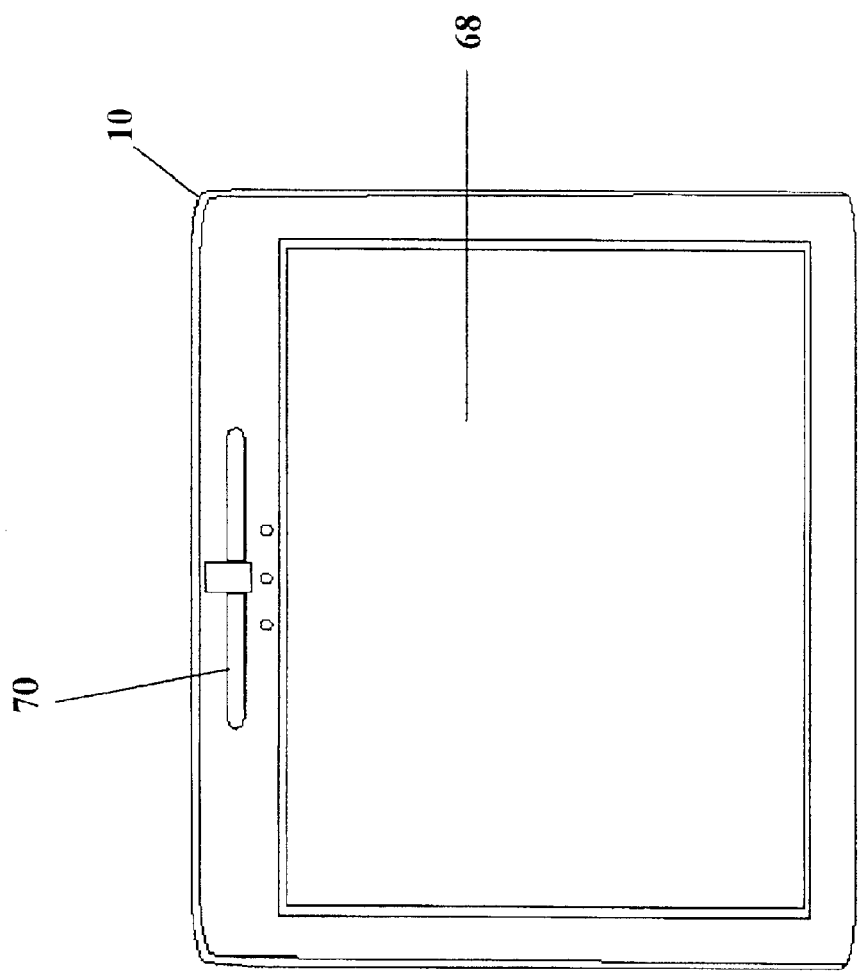
FIG. 9(a) presents a top view of the portable computer in a tablet configuration according to a second embodiment of the present invention.
Figure 9B:
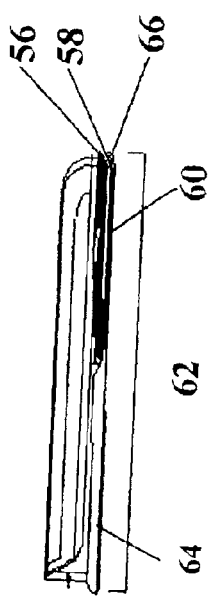
FIG. 9(b) presents a side view of the portable computer in a tablet configuration according to a second embodiment of the present invention.
Figure 10A:
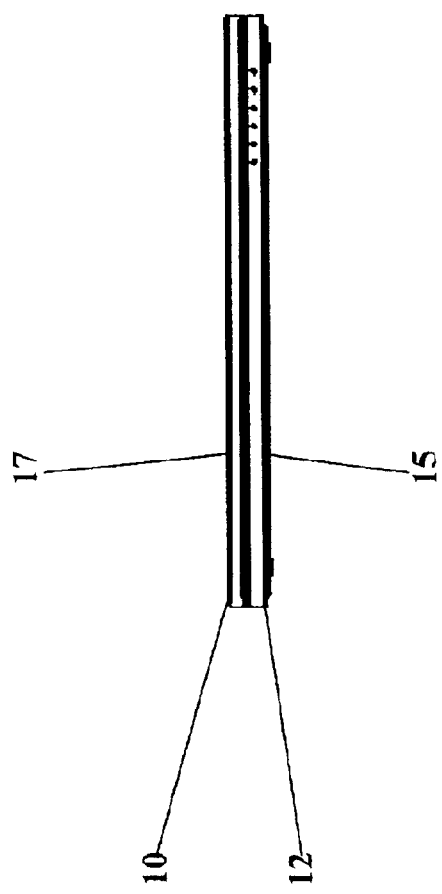
FIGS. 10(a) and 10(b) illustrate a portable computer in the closed configuration according to a third embodiment of the invention.
Figure 10B:
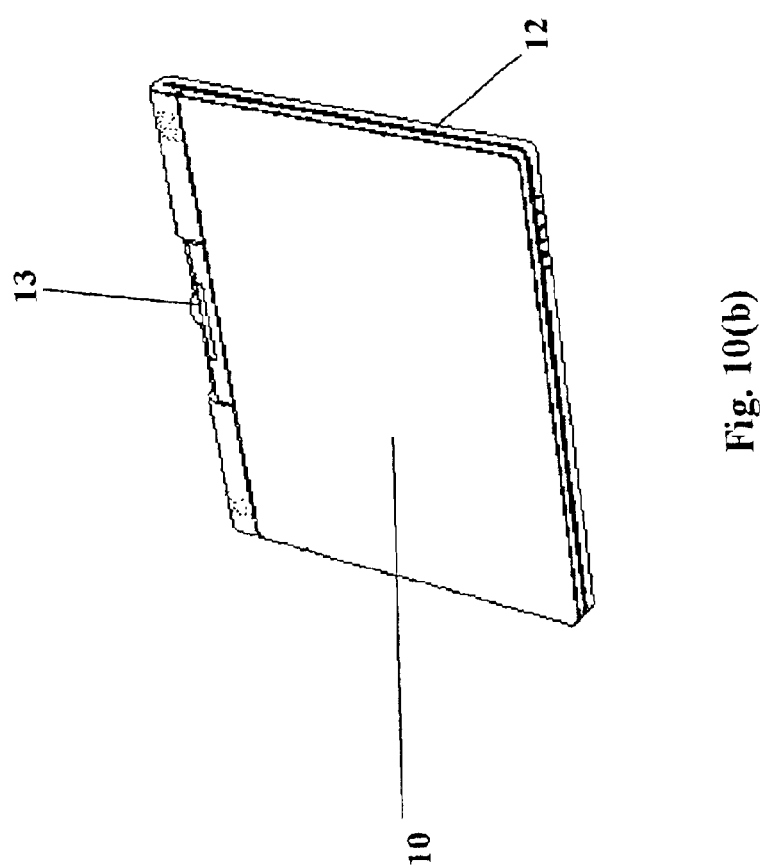
Figure 11B:
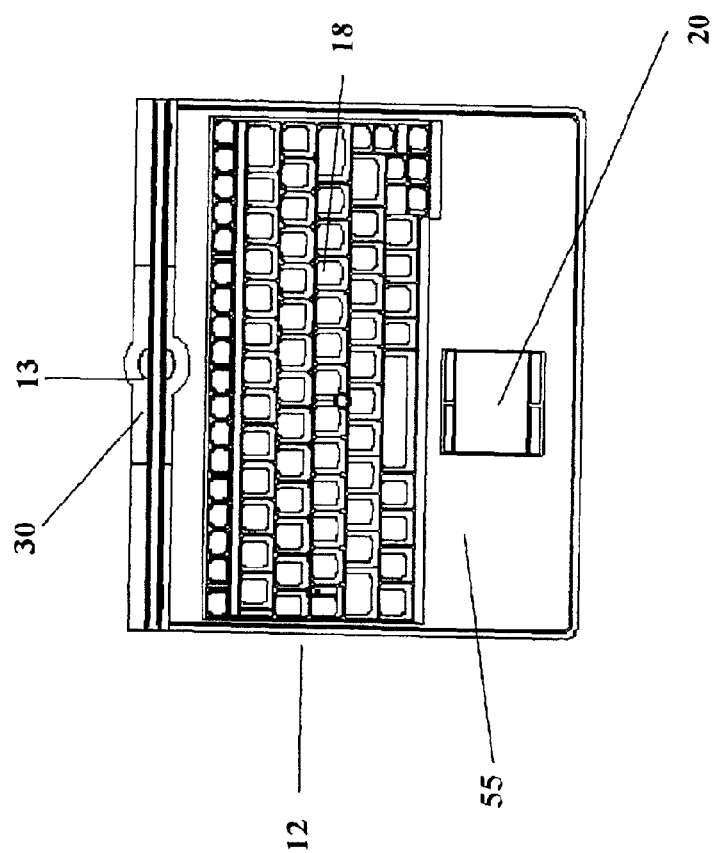
Figure 12A:
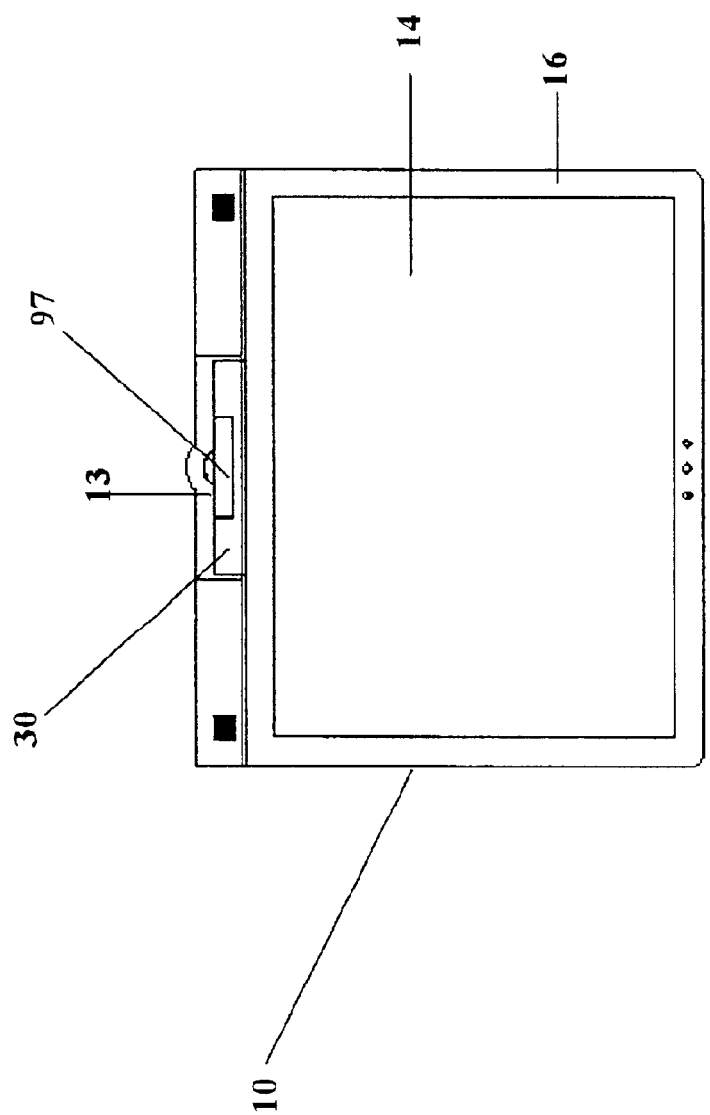
FIGS. 12(a) and 12(b) illustrate a portable computer in the tablet configuration according to a third embodiment of the invention
Figure 12B:
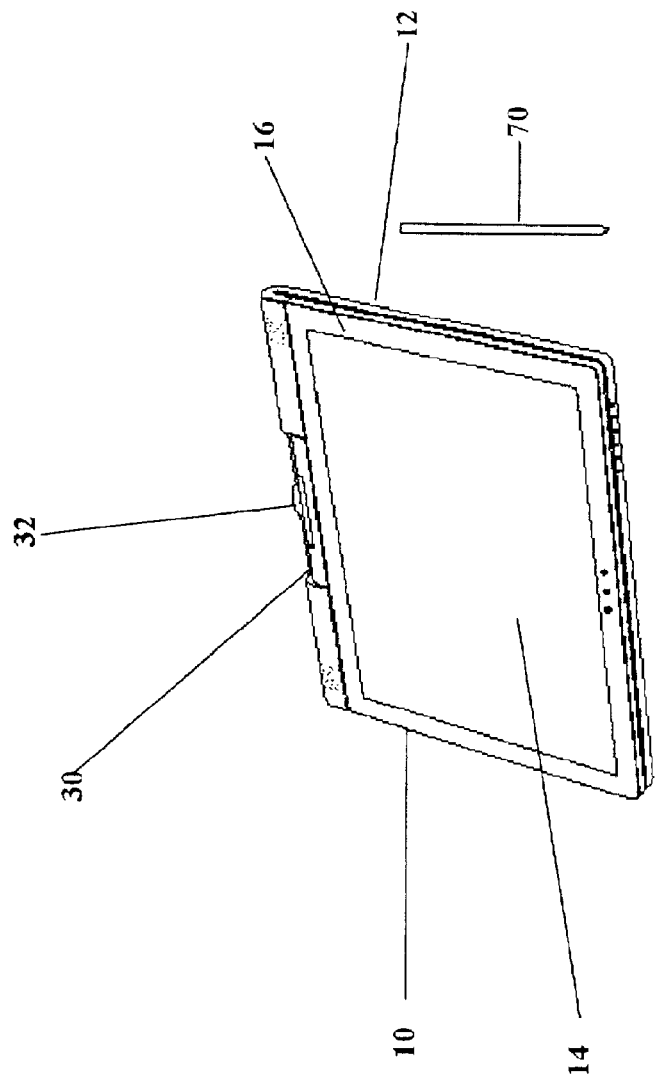

Embodiments of Type Shown in FIGS. 7–9

An alternative embodiment of the present invention is illustrated in FIGS. 7–9. The portable computer may include a display unit 10, a cover unit 52, and a base unit 12 having a keyboard 18 or other primary input device. The display unit 10 may include a display screen 16. The display unit 10, base unit 12 or both may include a central processing unit (not shown) and a memory (not shown). The location of the central processor and/or the memory may depend upon weight, heat, space and signal processing constraints. The cover unit 52 may connect the base unit 12 to the display unit 10. The cover unit 52 may be fixedly or removeably attached to the display unit 10 and the base unit 12 via fasteners (screws, snaps, etc.), adhesives (glue, Velcro, etc.) or the like. In embodiments of the invention, the cover unit 52 may be integrated with the display unit 10 and/or the base unit 12. For example, in an embodiment of the invention, the base unit 12 (including the keyboard 18 or other primary input device) and cover unit 52 may be joined so that the base unit 12 is located above a front portion 64 of the cover unit bottom section 62.

The display unit 10 may be electronically connected to the base unit 12 via a communication cable. In one embodiment of the invention, the communication cable may be a Universal Serial Bus cable. In embodiments of the invention, the communication cable may be embedded within or attached to a surface of the cover unit 52.

In the illustrated embodiment, when the portable computer is in closed configuration, as shown in FIG. 7, the display unit 10 may lie face down on the top surface 55 of the base unit 12. The cover unit 52 may be attached to the top rear surface 58 of the display unit 10 and provide protection to the display unit 10 and the base unit 12 during storage or transportation of the portable computer.

When the portable computer is placed in laptop configuration, as illustrated in FIGS. 8(a) and 8(b), the display unit 10 may rest at a laptop tilt angle relative to the base unit 12. In the laptop configuration, portions of the cover unit 52 may be used as a stand to support the display unit 10. For example, in the illustrated embodiment, the cover unit top section 57 may be attached to the top rear surface 58 of the display unit 10 and lies flat (parallel against the top rear surface 58 of the display unit 10). The cover unit middle section 60 and the rear portion 66 of the cover unit bottom section 62 may be utilized as the stand. The angle between the cover unit middle section 60 and the top rear surface 58 of the display unit 10 may be between about 110 and about 170 degrees for example.

The cover unit bottom section 62 may be divided into a front portion 64 and a rear portion 66. Both the front portion 64 and the rear portion 66 may be parallel to the surface on which the portable computer is placed. The front portion 64 may protrude slightly beyond the edge of the display unit 10 when the portable computer is in either the closed or tablet configuration. The base unit 12 may rest upon the front portion 64 of the cover unit bottom section. In the laptop configuration, the bottom surface of the display unit 10 may abut the rear edge of the base unit 54 at the boundary between the front portion 64 and rear portion 66 of the cover unit bottom section 62. As a result, the rear edge of the base unit 12 may act as a stop for the display unit 10 so that the weight of the display unit 10 forces the display unit 10 into contact with the rear edge of the base unit 12.

The rear portion 66 of the cover unit bottom section 62 may be connected to the cover unit middle section 60 at an angle. In embodiments of the invention of the type shown in FIGS. 7–9, the angle of the rear cover unit bottom section 66 and the cover unit middle section 60 may be between 30 and 60 degrees. The angle between the cover unit middle section 60 and the cover unit bottom section 66 may depend upon the desired laptop tilt angle.

In the tablet mode, as illustrated in FIG. 9, the display unit 10 may lie parallel to the base unit 12 so as to cover the keyboard 18 or other primary input device(s). The display screen 16 in the display unit 10 may be viewable and usable by a user as a touchscreen. The user may write on the display 16 with an electronic stylus 70. The covering of the keyboard 18 or other primary input device(s) by the display unit 10 may prevent errant input as well as damage to the keyboard 18 or other primary input device(s).

In the tablet mode, the cover unit top section 57 and cover unit middle section 60 may fold onto each other and may be tucked away underneath a portion of the display unit 10 and above the rear portion 66 of the cover unit bottom section 62. The rear surface of the cover unit top section 57 may contact the rear surface of the cover unit middle section 60. The front surface of the cover unit middle surface 60 may fold onto the top surface of the rear portion 66 of the cover unit bottom section. The folded portions of the cover unit 52 may be approximately the same height as the base unit 12 and together with the base unit 12 may provide a substantially flat surface on which the display unit 10 rests on.

The cover unit 52 may be made of a flexible material, such as leather or plastic. The cover unit 52 may also have seams or grooves at the interfaces or boundaries between sections. In alternative embodiments, the sections of the cover unit 52 may be joined using hinges. A latching assembly 60, an embodiment of which is shown in FIGS. 6(a)–6(e) may also be included in embodiments of the invention of the type shown in FIGS. 7–9 to maintain the portable computer in a closed configuration, a tablet configuration, or both.

Embodiments of Type Shown in FIGS. 10–14

According to other embodiments of the invention (illustrated in FIGS. 10–12), the display unit 10 and the base unit 12 may be coupled by a hinging assembly 13 that allows the display unit 10 to rotate about two perpendicular axes of rotation with respect to the base unit. The display unit 10 may include a display screen 14, a display frame 16, and a rear surface 17 of the display unit 10. The base unit 12 may include a pointing device 20, a keyboard 18, a bottom surface 15, and a top surface 55. The display unit 10, the base unit 12, or both may include a central processing unit (not shown) and/or a memory (not shown).

In the illustrated embodiment, the portable computer may be moved from the closed configuration to the laptop configuration by rotating the A hinge 30 about an axis of rotation that is parallel to the top surface 55 of the base unit 12 (referred to hereinafter as the "horizontal axis") until the display unit 10 reaches the laptop tilting angle (approximately 90° in the illustrated embodiment) with respect to the base unit 12. From the laptop configuration, the portable computer may be changed into the tablet configuration by first rotating the B hinge 32 approximately 180° about an axis of rotation that is perpendicular to the top surface 55 of the base unit 12 (referred to hereinafter as the "vertical axis"). The display unit 10 may then be brought back to a zero angle relative to the base unit 12 by rotating the first hinge in the reverse direction. In the resulting tablet configuration, the rear surface 17 of the display unit 10 may be placed over the top surface 55 of the base unit 12, including the keyboard 18, pointing device 20 or other primary input device(s).

In embodiments of the invention, the laptop tilting angle may be greater or less than the angle at which the display unit 10 is placed relative to the base unit 12 to begin swiveling of the display unit. For example, in embodiments of the invention, the A hinge 30 may have a range of rotation with an upper limit of about 180 degrees (i.e., so that the display unit 10 may lay flat on the surface supporting the base unit 12). However, the user may place the display unit 10 at a tilt angle of only about 90 degrees before swiveling the display unit 10 relative to the display unit by rotating the B hinge 32. In such embodiments, it should be understood that the term "laptop configuration" is meant to cover both the configuration in which the display unit 10 is at an angle of about 90 degrees relative to the base unit 12, as well as configurations in which the display unit 10 is at other tilting angles with respect to the base unit 12.

FIG. 13(e) illustrates the hinging assembly 13. As discussed above, the A hinge 30 may be rotated to allow the display unit 10 to be tilted relative the base unit 12 to place the portable computer in the laptop configuration, and the B hinge 32 may be swiveled and the A hinge 30 rotated to allow the portable computer to be placed in the tablet configuration. The hinging assembly 13 may include a B hinge 30 oriented to rotate a shaft 98 about the vertical axis. The shaft 98 may be coupled to a support plate 97. Consequently, the support plate may also rotate about the vertical axis. The hinging assembly 13 may also include an A hinge 30 that couples the support plate 97 (or a portion thereof) to the display unit 10 such that the display unit 10 may rotate about an axis of rotation perpendicular to the shaft 98 (i.e., parallel to the top surface 55 of the base unit).

Figure 13A:
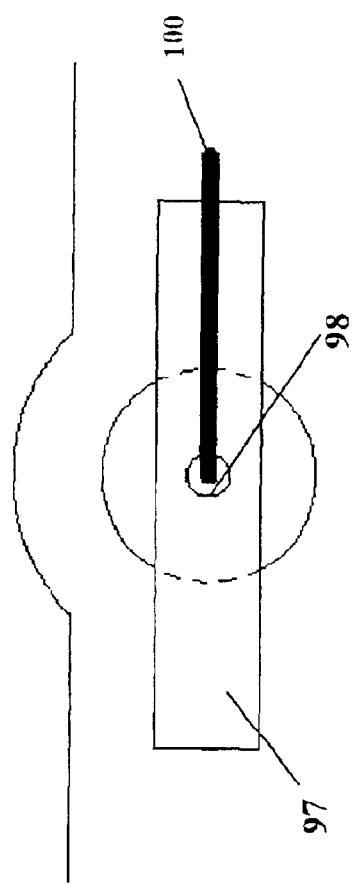
FIG. 13(a) illustrates a top view of a portion of a hinging assembly as it would appear when the portable computer is in the laptop configuration according to a third embodiment of the invention.
Figure 13B:
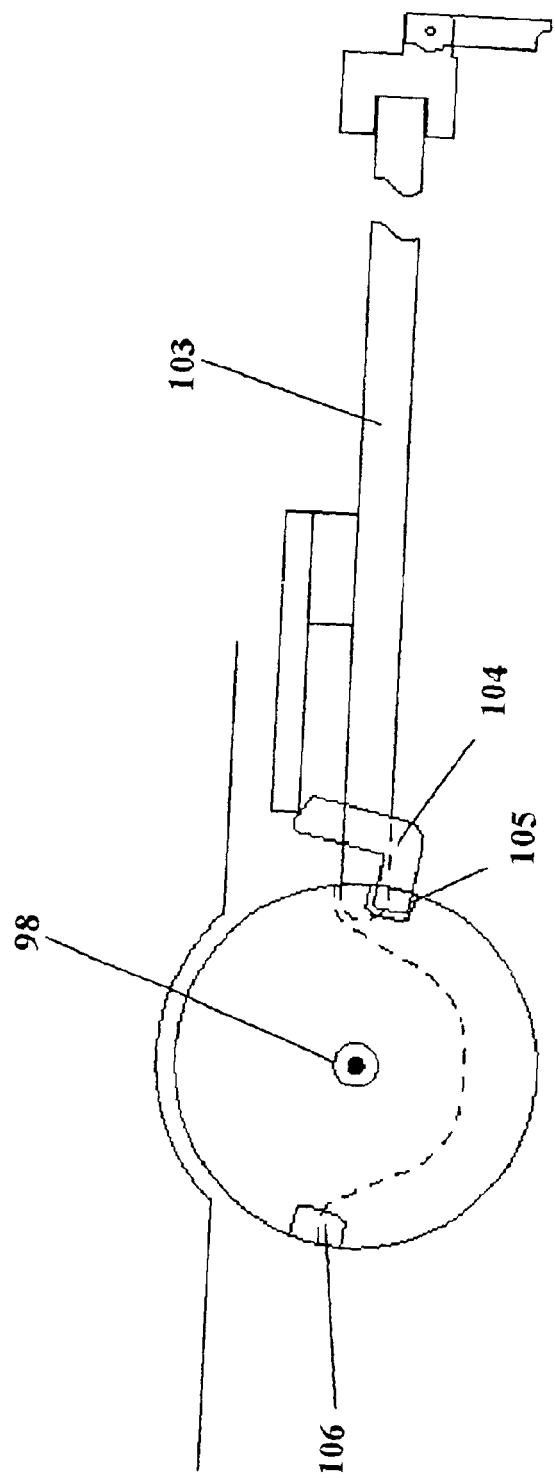
FIG. 13(b) illustrates a top view of a portion of a hinging assembly and a locking mechanism according to a third embodiment of the invention.
Figure 13C:
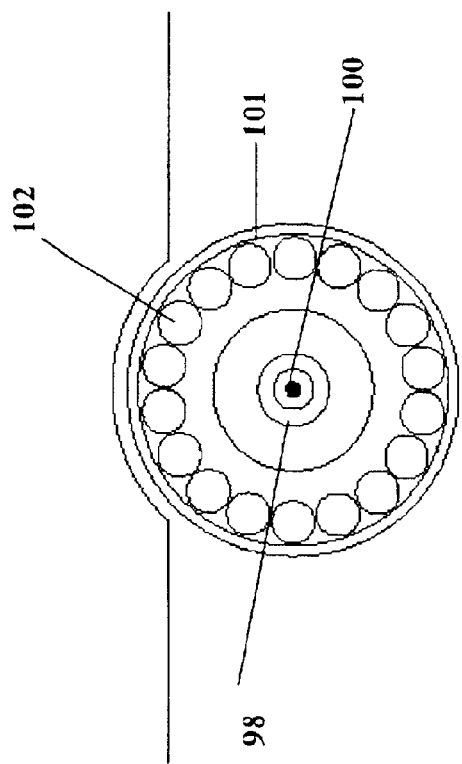
FIG. 13(c) illustrates a top view of a portion of a hinging assembly according to a third embodiment of the invention.
Figure 13D:
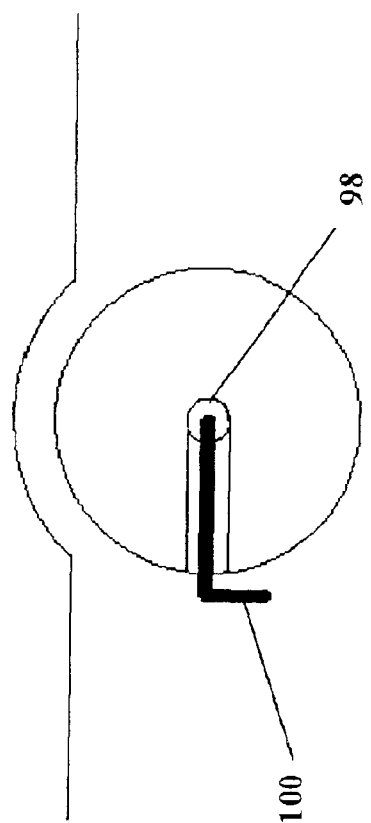
FIG. 13(d) illustrates a cross-sectional top view of a shaft that may be included in a hinging assembly according to a third embodiment of the invention.

As shown in FIG. 13(c), in embodiments of the invention, the B hinge 32 may be a ball bearing having a inner race 99 coupled to the shaft 98 and an outer race 101 coupled to the base unit 12. A number of rolling elements 102, may be packed in between the inner race 99 and the outer race 101 to permit rotation of the inner race 99 relative to the outer race 101. The rolling elements 102 may be lubricated to smoothen this rotational motion.

The B hinge 32 may be locked to prevent swiveling (i.e., rotation about the vertical axis) of the display unit 10 when the portable computer is not in the laptop configuration. This may be accomplished by coupling a locking pin 103 to components of the hinging assembly 13 that would otherwise rotate about the vertical axis with respect to each other. For example, the locking pin 103 may be pivotally coupled to the inner race of the B hinge 32, the shaft 98, the support plate 97 or the display unit 10 at one end. A second end of the locking pin 103 may be inserted into a cavity 105 in the outer race 101 of the B hinge 30 or a portion of the base unit 12.

A cable 100 may connect components in the base unit 12 to components in the display unit 10 so that signals representative of user input, data, control commands, status information, or the like may be transmitted therebetween. In embodiments of the invention similar to that shown in FIGS. 13(a)–13(e), the shaft 98 may be hollow and a portion of the cable 100 may pass through the interior of the shaft 98. The cable may also pass through or along a surface of the support plate 97 and the A hinge 30 (or portions thereof) to the display unit 10. The rotation of the B hinge 32 may be limited (e.g., using a physical stop) to prevent excessive twisting of the cable 100.

Alternatively, as shown in FIGS. 14(a)–14(f), the locking pin 103 may be pivotally attached at one end to a lever 104 running through the base unit 12, and the other end of the locking pin 103 may be inserted into a cavity 105 of a component that rotates about the vertical axis (i.e., swivels) relative to the base unit 12, such as the inner race of the B hinge 32, the shaft 98, etc. It may be preferable to couple the inserted end of the locking pin 103 into an element that rotates within the framework of the base unit 12, so as to protect the locking pin from damage. In order to initiate the rotation/swiveling of the B hinge 32, the lever 104 may be actuated to pivot the locking pin 103 so as to release the free end of the locking pin 103 from the cavity 105. Actuating the lever 104 may cause the lever 104 to be pushed in toward the inner race 99 of the B hinge 32 and may be accomplished with a push button, or some other user-accessible mechanism.

Figure 14A:
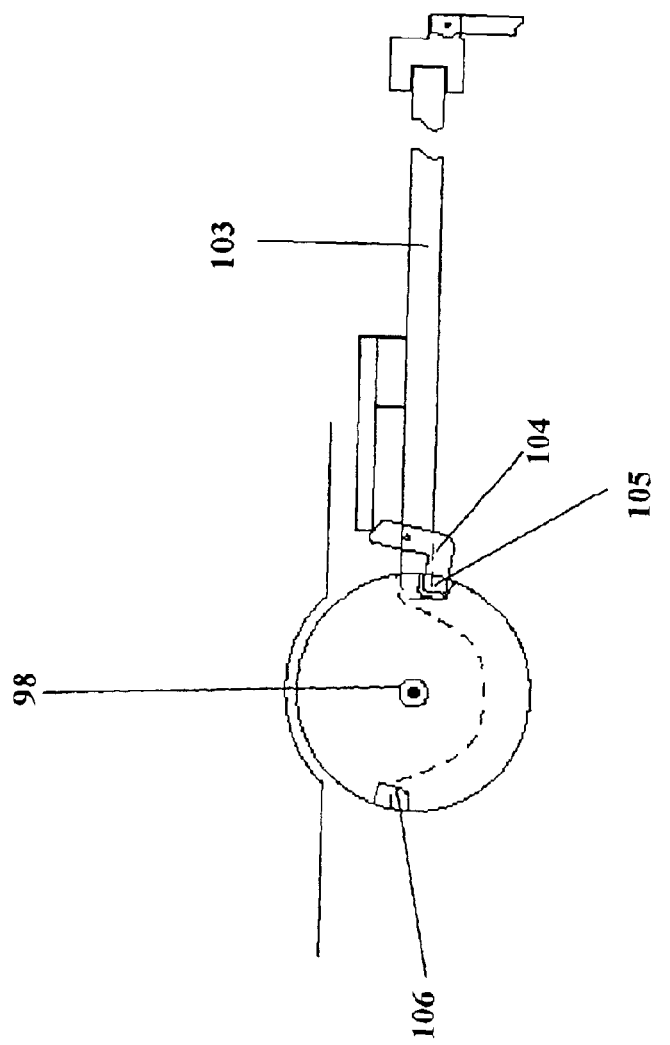
FIGS. 14(a)–14(c) show a locking mechanism at various stages as the portable computer is changed from the laptop configuration to the tablet configuration according to a third embodiment of the invention.
Figure 14B:
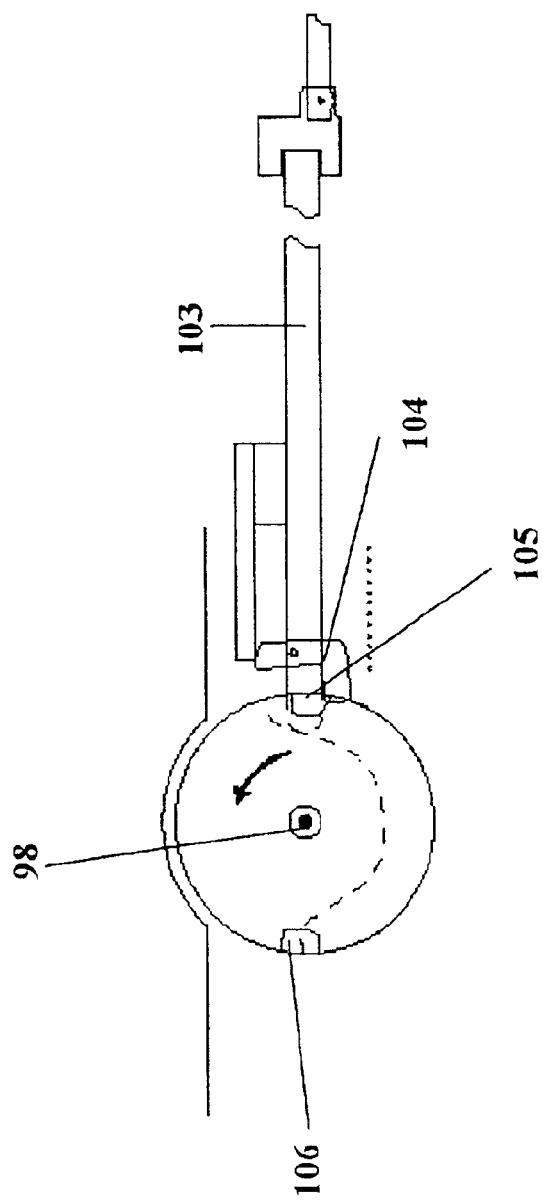
Figure 14C:
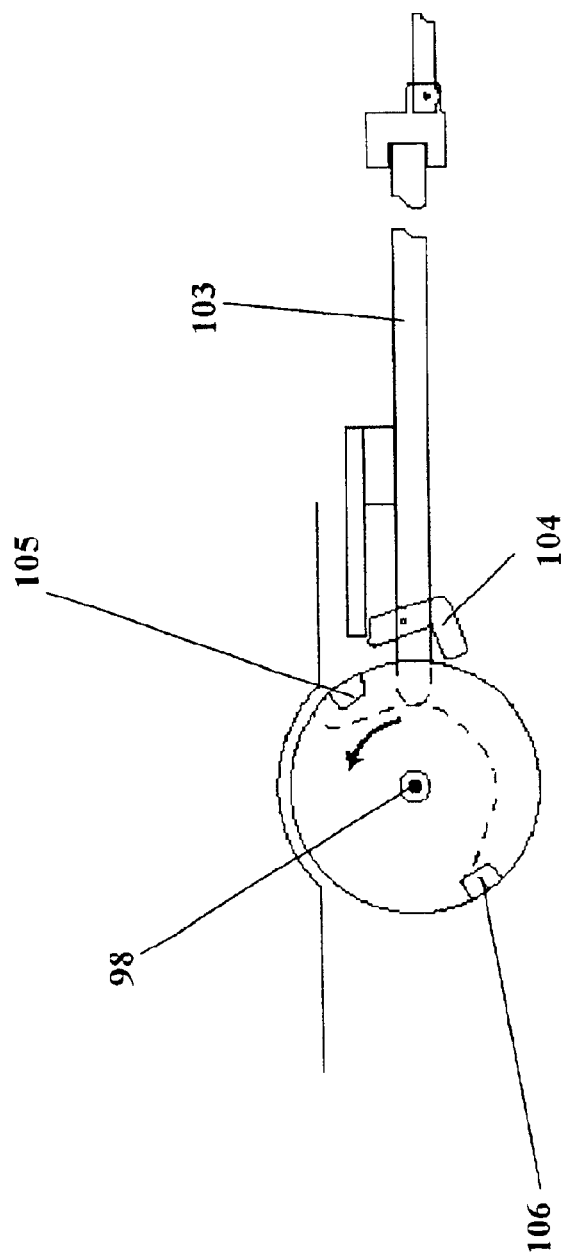

As shown in FIGS. 14(a)–14(c), in embodiments of the invention, the component into which the locking pin 103 is inserted may have two cavities—a first cavity 105 corresponding to the laptop configuration and a second cavity 106 corresponding to the configuration in which the display unit 10 has been swiveled approximately 180°. The locking pin 103 may be released from the first cavity 105 to begin swiveling of the display unit 10 and may be inserted into the second cavity 106 when swiveling is completed.

A latching assembly 60, an embodiment of which is shown in FIGS. 6(a)–6(e) may also be included in embodiments of the invention of the type shown in FIGS. 10-14 to maintain the portable computer in a closed configuration, a tablet configuration, or both.

While the description above refers to particular embodiments of the present invention, it should be readily apparent to people of ordinary skill in the art that a number of modifications may be made without departing from the spirit thereof The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. A portable computer configurable in a tablet configuration, a laptop configuration, and a closed configuration, said portable computer comprising:
   a display unit having a display device and a back surface;
   a base unit having a primary input device and a bottom surface; and
   a hinging assembly coupling said display unit to said base unit, said hinging assembly having a first hinge with a first axis of rotation and a second hinge with a second axis of rotation, wherein said back surface of said display unit is in contact with said bottom surface of said base unit when said portable computer is in said tablet mode,
   said primary input device and said display device are between said back surface of said display unit and said bottom surface of said base unit when said portable computer is in said closed configuration,
   one of said first hinge and said second hinge is rotated to reconfigure said portable computer between said closed configuration and said laptop configuration,
   said first hinge and said second hinge are rotated to reconfigure said portable computer between said closed configuration and said tablet configuration, and a first friction force resists rotation of said first hinge about said first axis of rotation, a second friction force resists rotation of said second hinge about said second axis of rotation, and said first friction force is of a smaller magnitude than said second friction force.

2. The portable computer according to claim 1, wherein a separating force applied to separate said display unit from said base unit causes said first hinge to rotate until an angle of rotation of said first hinge equals a maximum angle of rotation associated with said first hinge and the second hinge does not rotate and a larger magnitude application of said separating force causes said second hinge to rotate, wherein the portable computer does not include a latching mechanism and the first hinge and the second hinge do not include a locking mechanism.

3. The portable computer according to claim 1, wherein said first friction force resists rotation of said first hinge in a first direction and a third friction force resists rotation of said first hinge in a second direction opposite to said first direction, said third friction force having a greater magnitude than both sad first friction force and said second friction force, which allows the first hinge to rotate first when the portable computer is opened to said laptop configuration from said closed configuration and the first hinge to rotate second when the portable computer is changed from said laptop configuration to said closed configuration.

4. The portable computer according to claim 3, wherein said second hinge has a first amount of friction when rotated in a first direction and a second amour of friction when rotated in a second direction opposite to said first direction.

5. The portable computer according to claim 1, said hinging assembly further including an armature, wherein said first hinge is coupled to said armature at a first pivot point and said second hinge is coupled to said armature at a second pivot point.

6. The portable computer according to claim 5, wherein said first hinge is coupled to said display unit so as to permit rotation of said display unit relative to said armature and said second hinge is coupled to said base unit so as to permit rotation of said base unit relative to said armature.

7. The portable computer according to claim 5, wherein said first hinge is coupled to said base unit so as to permit rotation of said base unit relative to said armature and said second hinge is coupled to said display unit so as to permit rotation of said display unit relative to said armature.

8. A portable computer configurable in a tablet configuration, a laptop configuration, and a closed configuration, said portable computer comprising:
   a display unit having a display device and a back surface;
   a base unit having a primary input device and a bottom surface;
   a hinging assembly coupling said display unit to said base unit, said hinging assembly having a first hinge with a first axis of rotation and a second hinge with a second axis of rotation; and
   a latching assembly to maintain said portable computer in one of said closed configuration and said tablet configuration,
   wherein said back surface of said display unit is in contact with said bottom surface of said base unit when said portable computer is in said tablet mode,
   said primary input device and said display device are between said back surface of said display unit and said bottom surface of said base unit when said portable computer is in said closed configuration,
   one of said first hinge and said second hinge is rotated to reconfigure said portable computer between said closed configuration and said laptop configuration,
   said first hinge and said second hinge are rotated to reconfigure said portable computer between said closed configuration and said tablet configuration,
   said latching assembly includes a latching arm having a first projection and a latch body having a first cavity adapted to receive said first projection to maintain said portable computer in one of said closed configuration and said tablet configuration, and
   said latching arm includes a second projection, wherein said first cavity is also adapted to receive said second projection, and further wherein said first projection is received by said first cavity to maintain said portable computer in said closed configuration, and further wherein said second projection is received by said first cavity to maintain said portable computer in said tablet configuration.

9. A portable computer configurable in a tablet configuration, a laptop configuration, and a closed configuration, said portable computer comprising:
   a display unit having a display device and a back surface;
   a base unit having a primary input device and a bottom surface;
   a hinging assembly coupling said display unit to said base unit, said hinging assembly having a first hinge with a first axis of rotation and a second hinge with a second axis of rotation; and
   a latching assembly to maintain said portable computer in one of said closed configuration and said tablet configuration, wherein said back surface of said display unit is in contact with said bottom surface of said base unit when said portable computer is in said tablet mode, said primary input device and said display device are between said back surface of said display unit and said bottom surface of said base unit when said portable computer is in said closed configuration, one of said first hinge and said second hinge is rotated to reconfigure said portable computer between said closed configuration and said laptop configuration, said first hinge and said second hinge are rotated to reconfigure said portable computer between said closed configuration and said tablet configuration, said latching assembly includes a latching arm having a first projection and a latch body having a first cavity adapted to receive said first projection to maintain said portable computer in one of said closed configuration and said tablet configuration, and said latching arm includes a second projection and said latch body further including a second cavity adapted to receive said second projection, wherein said first projection is received by said first cavity to maintain said portable computer in said closed configuration, and further wherein said second projection is received by said second cavity to maintain said portable computer in said tablet configuration.

10. A portable computer configurable in a tablet configuration, a laptop configuration, and a closed configuration, said portable computer comprising:

a display unit having a display device and a back surface;

a base unit having a primary input device and a bottom surface; and a hinging assembly coupling said display unit to said base unit, said hinging assembly having a first hinge with a first axis of rotation and a second hinge with a second axis of rotation, wherein said back surface of said display unit is in contact with said bottom surface of said base unit when said portable computer is in said tablet mode, said primary input device and said display device are between said back surface of said display unit and said bottom surface of said base unit when said portable computer is in said closed configuration, one of said first hinge and said second hinge is rotated to reconfigure said portable computer between said closed configuration and said laptop configuration, said first hinge and said second hinge are rotated to reconfigure said portable computer between said closed configuration and said tablet configuration, and said base unit partially rests on one of said first hinge and said second hinge when said portable computer is in said laptop configuration.

11. A method for reconfiguring a portable computer among a tablet configuration, a laptop configuration, and a closed configuration, wherein said display device is contained in a display unit and said primary input device is contained in a base unit, said method comprising:

when said portable computer is in said closed configuration such that said display device and said primary input device are contained between a back surface of said display unit and a bottom surface of said base unit, rotating a first hinge about a first axis of rotation to tilt said display unit relative to said base unit until said portable computer is in said laptop configuration;

when said portable computer is in said laptop configuration, rotating a second hinge about a second axis of rotation parallel to said first axis of rotation until said portable computer is in said tablet configuration; and closing a latching assembly when said portable computer is in said tablet configuration to couple said base unit to said display unit.

12. The method according to claim 11, further including opening said latching assembly when said portable computer is in said closed configuration.

13. The method according to claim 11, wherein rotating said first hinge includes applying a separating force to said display unit and said base unit and a first friction force resists rotation of said first hinge and a second friction force rotation of said second hinge.

14. The method according to claim 13, wherein said first friction force is smaller than said second friction force when said portable computer is being changed from said closed configuration to said laptop configuration, which allows the first hinge to rotate before the second hinge rotates.

15. The method according to claim 13, wherein said first friction force is greater than said second friction force when said portable computer is being changed from said tablet configuration to said laptop configuration, which allows the second hinge to rotate before the first hinge rotates.

* * * * *